US012389946B2

(12) United States Patent
Spencer et al.

(10) Patent No.: US 12,389,946 B2
(45) Date of Patent: Aug. 19, 2025

(54) ARTICLE, APPARATUS AND METHOD OF HEATING A SMOKABLE MATERIAL

(71) Applicant: Nicoventures Trading Limited, London (GB)

(72) Inventors: Alfred Vincent Spencer, London (GB); Anna Azzopardi, London (GB)

(73) Assignee: NICOVENTURES TRADING LIMITED, London (GB)

( * ) Notice: Subject to any disclaimer, the term of this patent is extended or adjusted under 35 U.S.C. 154(b) by 134 days.

(21) Appl. No.: 17/649,206

(22) Filed: Jan. 28, 2022

(65) Prior Publication Data

US 2022/0175039 A1 Jun. 9, 2022

Related U.S. Application Data

(63) Continuation of application No. 16/096,874, filed as application No. PCT/EP2017/060268 on Apr. 28, 2017.

(30) Foreign Application Priority Data

Apr. 29, 2016 (GB) ..................................... 1607474

(51) Int. Cl.

| | |
|---|---|
| ***A24F 40/46*** | (2020.01) |
| ***A24D 1/20*** | (2020.01) |
| ***A24F 40/40*** | (2020.01) |
| ***A24F 40/42*** | (2020.01) |
| ***A24F 42/60*** | (2020.01) |
| ***F21V 21/14*** | (2006.01) |

(Continued)

(52) U.S. Cl.

CPC ................ *A24F 40/46* (2020.01); *A24D 1/20* (2020.01); *A24F 40/40* (2020.01); *A24F 40/42* (2020.01); *A24F 42/60* (2020.01); *F21V 21/14* (2013.01); *F21V 23/003* (2013.01); *A24F 40/20* (2020.01); *A24F 40/50* (2020.01); *F21Y 2105/18* (2016.08); *F21Y 2115/10* (2016.08)

(58) Field of Classification Search

None

See application file for complete search history.

(56) References Cited

U.S. PATENT DOCUMENTS 5,499,636 A 3/1996 Baggett
5,934,289 A * 8/1999 Watkins et al. ......... A24F 40/46 131/194

(Continued)

FOREIGN PATENT DOCUMENTS

CN 1122213 A 5/1996
CN 101975780 A 2/2011

(Continued)

OTHER PUBLICATIONS

Office Action for European Patent Application No. 17723033.1, mailed on Feb. 4, 2022.

(Continued)

*Primary Examiner* — Dionne W. Mayes

(74) *Attorney, Agent, or Firm* — BURR & FORMAN

(57) ABSTRACT

A system including an article containing smokable material; and an apparatus for volatilizing at least one component of the smokable material is disclosed. A method of heating a smokable material to volatilize at least one component of the smokable material also is disclosed.

5 Claims, 9 Drawing Sheets

(51) Int. Cl.

| | |
|---|---|
| ***F21V 23/00*** | (2015.01) |
| *A24F 40/20* | (2020.01) |
| *A24F 40/50* | (2020.01) |
| *F21Y 105/18* | (2016.01) |
| *F21Y 115/10* | (2016.01) |

(56) References Cited

U.S. PATENT DOCUMENTS

| | | | | |
|---|---|---|---|---|
| 7,654,976 | B2 | 2/2010 | Peterson | |
| 2001/0027791 | A1 | 10/2001 | Wallace | |
| 2002/0126036 | A1 | 9/2002 | Flaherty | |
| 2011/0152770 | A1 | 6/2011 | Diperna | |
| 2012/0325227 | A1 | 12/2012 | Robinson | |
| 2013/0283196 | A1 | 10/2013 | Farnan | |
| 2014/0060554 | A1 | 3/2014 | Collett | |
| 2014/0182608 | A1 | 7/2014 | Egoyants | |
| 2014/0276419 | A1 | 9/2014 | Rosinko | |
| 2014/0311503 | A1 | 10/2014 | Quming | |
| 2014/0338680 | A1* | 11/2014 | Abramov et al. | A24F 40/20 131/328 |
| 2018/0332894 | A1 | 11/2018 | Gill | |

FOREIGN PATENT DOCUMENTS

| | | | |
|---|---|---|---|
| CN | 103416852 | A | 3/2013 |
| CN | 103610232 | A | 3/2014 |
| CN | 103717098 | A | 4/2014 |
| CN | 203563690 | U | 4/2014 |
| CN | 203646497 | U | 6/2014 |
| CN | 104035527 | | 9/2014 |
| CN | 204177782 | U | 2/2015 |
| CN | 104522892 | A | 4/2015 |
| CN | 104856235 | A | 8/2015 |
| CN | 204635080 | U | 9/2015 |
| EP | 0951219 | A1 | 10/1999 |
| EP | 2462821 | A1 | 6/2012 |
| JP | 2014519850 | A | 8/2014 |
| JP | 2014520542 | A | 8/2014 |
| JP | 2015532828 | A | 11/2015 |
| JP | 6773800 | B2 | 10/2020 |
| KR | 20120074625 | A | 7/2012 |
| KR | 20120103351 | A | 9/2012 |
| RU | 121737 | U1 | 11/2012 |
| SU | 719560 | A1 | 3/1980 |
| UA | 111622 | C2 | 5/2016 |
| WO | 201334458 | A1 | 3/2013 |
| WO | 2013034459 | A1 | 3/2013 |
| WO | 2013034460 | A1 | 3/2013 |
| WO | 2014110119 | A1 | 7/2014 |
| WO | 2014140320 | A1 | 9/2014 |
| WO | 2015066127 | A1 | 5/2015 |
| WO | 2016112579 | A1 | 7/2016 |
| WO | 2017186944 | A1 | 11/2017 |
| WO | 2017186946 | A1 | 11/2017 |

OTHER PUBLICATIONS

Definition entry for the word "impinge" taken from www.dictionary.com, printed from the internet in Feb. 2022. (Year: 2022).

English Translation of Office Action mailed on Oct. 16, 2019 for Russian Application No. 20181377971.

International Preliminary Report on Patentability for Application No. PCT/EP2016/060752, mailed on Aug. 10, 2017.

International Preliminary Report on Patentability for Application No. PCT/EP2017/060268, mailed on Nov. 8, 2018.

International Preliminary Report on Patentability for Application No. PCT/EP2017/060270, mailed on Nov. 8, 2018.

International Search Report and Written Opinion for Application No. PCT/EP2017/060268, mailed on Aug. 23, 2017.

International Search Report for Application No. PCT/EP2016/060752, mailed on Aug. 5, 2016.

Notice of Reasons for Rejection for Japanese Application No. 2020-166919, mailed Nov. 24, 2021.

Office Action for Chinese Application No. 201780026107.5, mailed on Jul. 20, 2020.

Office Action for Japanese Application No. 2018-549157, mailed on Dec. 17, 2019.

Search Report mailed Jun. 19, 2015 for Great Britain Application No. GB1508405.6.

Written Opinion for Application No. PCT/EP2016/060752 mailed Apr. 3, 2017.

Written Opinion for Application No. PCT/EP2016/060752 mailed Aug. 5, 2016.

Japanese Office Action, Application No. 2018-549157, dated Dec. 1, 2019.

Russian Office Action, Application No. 2018137971, dated Oct. 16, 2019.

Chinese Office Action, Application No. 201680028124.8, dated Nov. 5, 2019.

Russian Office Action, Application No. 13733/ZA/19, dated Jun. 14, 2019.

International Search Report, Application No. PCT/EP2017/060270, mailed on Aug. 23, 2017.

Great Britain Search Report, Application No. GB1607475.9, mailed on Oct. 20, 2016.

Korean Office Action, Application No. 10-2017-7033005, mailed on Nov. 6, 2018.

Japanese Office Action, Application No. 2017-55989, mailed on Nov. 27, 2018.

Application and File History for U.S. Appl. No. 15/574,233, filed Nov. 15, 2017, Inventor: Frobisher, as available on PAIR at www.uspto.gov.

Application and File History for U.S. Appl. No. 16/096,863, filed Oct. 26, 2018, Inventor: Spencer, as available on PAIR at www.uspto.gov.

International Search Report, Application No. PCT/EP2014/060268 mailed on Aug. 23, 2017.

Great Britain Search Report, Application No. GB1607474.2, mailed on Oct. 20, 2016.

* cited by examiner

| Puff | Light Source Activated | Region Irradiated |
|---|---|---|
| 1 | L5, L6 | 642 |
| 2 | L5, L6 | 642 |
| 3 | L1, L2, L3, L4 | 641 |
| 4 | L1, L2, L3, L4 | 641 |
| 5 | L1, L2, L3, L4 | 641 |
| 6 | L1, L2, L3, L4 | 641 |
| 7 | L1, L2, L3, L4 | 641 |
| 8 | L7, L8, L9 | 643 |
| 9 | L7, L8, L9 | 643 |
| 10 | L7, L8, L9 | 643 |

FIG. 7

| Time | Flavour desired | Light Source Activated |
|---|---|---|
| 1s | 612a | L1, L2, L3, L5, L6, L7 |
| 2s | 612b | L5, L6, L7 |
| 3s | 612c | L7, L8 |

ARTICLE, APPARATUS AND METHOD OF HEATING A SMOKABLE MATERIAL

PRIORITY CLAIM

This application is a continuation of application Ser. No. 16/096,874 filed Oct. 26, 2018, which in turn is a National Phase entry of PCT Application No. PCT/EP2017/060268, filed Apr. 28, 2017, which claims priority from UK Patent Application No. 1607474.2, filed Apr. 29, 2016, each of which is hereby fully incorporated herein by reference. This application also is related to UK Application No. 1607475.9 and U.S. application Ser. No. 16/096,863 claiming priority thereto and filed on even date herewith, the entire contents of which are incorporated herein by reference.

TECHNICAL FIELD

The present disclosure relates to a combination of an article containing smokable material and an apparatus for volatilizing at least one component of the smokable material, and to a method of heating a smokable material.

BACKGROUND

Articles such as cigarettes, cigars and the like burn tobacco during use to create tobacco smoke. Attempts have been made to provide alternatives to these articles that burn tobacco by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine. Similarly, there are also so-called e-cigarette devices, which typically vaporize a liquid, which may or may not contain nicotine.

SUMMARY

According to a first aspect of the present disclosure, there is provided in combination, an article containing smokable material and an apparatus for volatilizing at least one component of the smokable material, wherein: the article is engageable with the apparatus and disengageable from the apparatus, the smokable material is a layer on at least one surface of the article, the apparatus comprises an irradiative light source for generating light, the article and the apparatus are arranged such that the irradiative light source and the smokable material overlap radially of the apparatus when the article is engaged with the apparatus, the irradiative light source is configured to emit light radially of the apparatus so as to impinge upon the smokable material on the at least one surface of the article to volatilize at least one component of the smokable material, and the irradiative light source and the smokable material are movable relative to each other when the article is engaged with the apparatus to enable light emitted by the irradiative light source to be selectively directed in use to different portions of the smokable material on the at least one surface of the article.

In an embodiment, the article comprises smokable material on an internal surface of the article.

In an embodiment, the article comprises smokable material on an external surface of the article. In an embodiment, the apparatus comprises an annular irradiative light source that substantially surrounds the external surface of the article.

According to a second aspect of the present disclosure, there is provided in combination, an article containing smokable material and apparatus for volatilizing at least one component of the smokable material, wherein: the article is engageable with the apparatus and disengageable from the apparatus; and wherein: the article comprises a wall defining a hollow interior, an inner surface of the wall having a layer of smokable material thereon; and the apparatus comprises an irradiative light source located in the apparatus; wherein the arrangement is such that light emitted by the irradiative light source in use is directed into the interior of the article when the article is engaged with the apparatus so as to impinge upon the smokable material on the inner surface of the wall of the article to volatilize at least one component of the smokable material; the apparatus being arranged to enable light emitted by the irradiative light source to be selectively directed in use to different portions of the smokable material on the inner surface of the wall of the article.

In an embodiment, the combination comprises a beam director for selectively directing light emitted by the irradiative light source in use to different portions of the smokable material of the article.

In an embodiment, the combination comprises a smokable material moving arrangement for moving the smokable material relative to the irradiative light source so as to selectively direct light emitted by the irradiative light source in use to different portions of the smokable material of the article.

In an embodiment, the combination comprises an irradiative light source moving arrangement for moving the irradiative light source relative to the smokable material so as to selectively direct light emitted by the irradiative light source in use to different portions of the smokable material of the article.

In an embodiment, the combination comprises plural irradiative light sources located in the apparatus, wherein the plural irradiative light sources are respectively directed at different portions of the smokable material of the article.

In an embodiment, the combination comprises control circuitry constructed and arranged to selectively power the plural irradiative light sources.

In an embodiment, the combination comprises control circuitry to control when the irradiative light source or sources emit irradiative light.

In an embodiment, the combination comprises control circuitry configured so that light emitted by the irradiative light source or sources is directed to each different portion of the smokable material only once.

In an embodiment, the combination comprises control circuitry configured so that light emitted by the irradiative light source or sources is directed to a plurality of different portions of the smokable material simultaneously.

In an embodiment, the apparatus comprises at least one air inlet and at least one airflow passage constructed and arranged so that in use air may enter the apparatus and be directed through the airflow passage over or through the smokable material without passing over the irradiative light source.

In an embodiment, the irradiative light source comprises a laser diode.

In an embodiment, the irradiative light source comprises a light emitting diode.

In an embodiment, the combination comprises plural irradiative light sources each of which comprises a light emitting diode.

In an embodiment, the combination is arranged such that light is emitted from the plurality of light emitting diodes in a predetermined sequence, wherein the plurality of light emitting diodes are at different orientations to each other such that they are each directed to a different location on the smokable material. In an embodiment, the predetermined sequence is determined by the user. In an embodiment, the predetermined sequence is determined by the user making a selection from a list of predetermined sequences.

In an embodiment, the smokable material comprises tobacco.

According to a third aspect of the present disclosure, there is provided a method of heating a smokable material to volatilize at least one component of the smokable material, the method comprising: engaging an article containing smokable material with apparatus for volatilizing at least one component of the smokable material, the apparatus comprising an irradiative light source for generating light, the smokable material being a layer on at least one surface of the article, the irradiative light source and the smokable material overlapping radially of the apparatus when the article is engaged with the apparatus; heating a first region of smokable material with light emitted by an irradiative light source; heating a second region of smokable material with light emitted by an irradiative light source; and moving the smokable material and the irradiative light source relative to each other, wherein light emitted by the irradiative light source or sources is emitted radially of the apparatus to impinge on the smokable material.

According to a fourth aspect of the present disclosure, there is provided a method of heating a smokable material to volatilize at least one component of the smokable material, the method comprising: heating a first region of smokable material with light emitted by an irradiative light source; and heating a second region of smokable material with light emitted by an irradiative light source; wherein the first region of smokable material and the second region of smokable material are provided on an inner surface of a wall that defines a hollow interior of an article.

In an embodiment, the irradiative light source that heats the first region of smokable material is the same irradiative light source that heats the second region of smokable material.

In an embodiment, the irradiative light source that heats the first region of smokable material is a different irradiative light source from the irradiative light source that heats the second region of smokable material.

In an embodiment, the method comprises: heating a plurality of regions of the smokable material in a predetermined sequence.

In an embodiment, the method comprises: moving the smokable material relative to the irradiative light source(s).

In an embodiment, the method comprises: moving the irradiative light source(s) relative to the smokable material.

In an embodiment, the method comprises: moving a beam deflector such that light emitted by the irradiative light source(s) is directed to a region of the smokable material before the beam deflector is moved and light emitted by the irradiative light source(s) is directed to a different region of the smokable material after the beam deflector has been moved.

Further features and advantages of the disclosure will become apparent from the following description of embodiments of the disclosure, given by way of example only, which is made with reference to the accompanying drawings.

BRIEF DESCRIPTION OF THE DRAWINGS

Embodiments of the disclosure will now be described, by way of example only, with reference to the accompanying drawings, in which:

FIG. 7 shows schematically an example of a sequence of operation of light sources;

DETAILED DESCRIPTION

Figure 1:
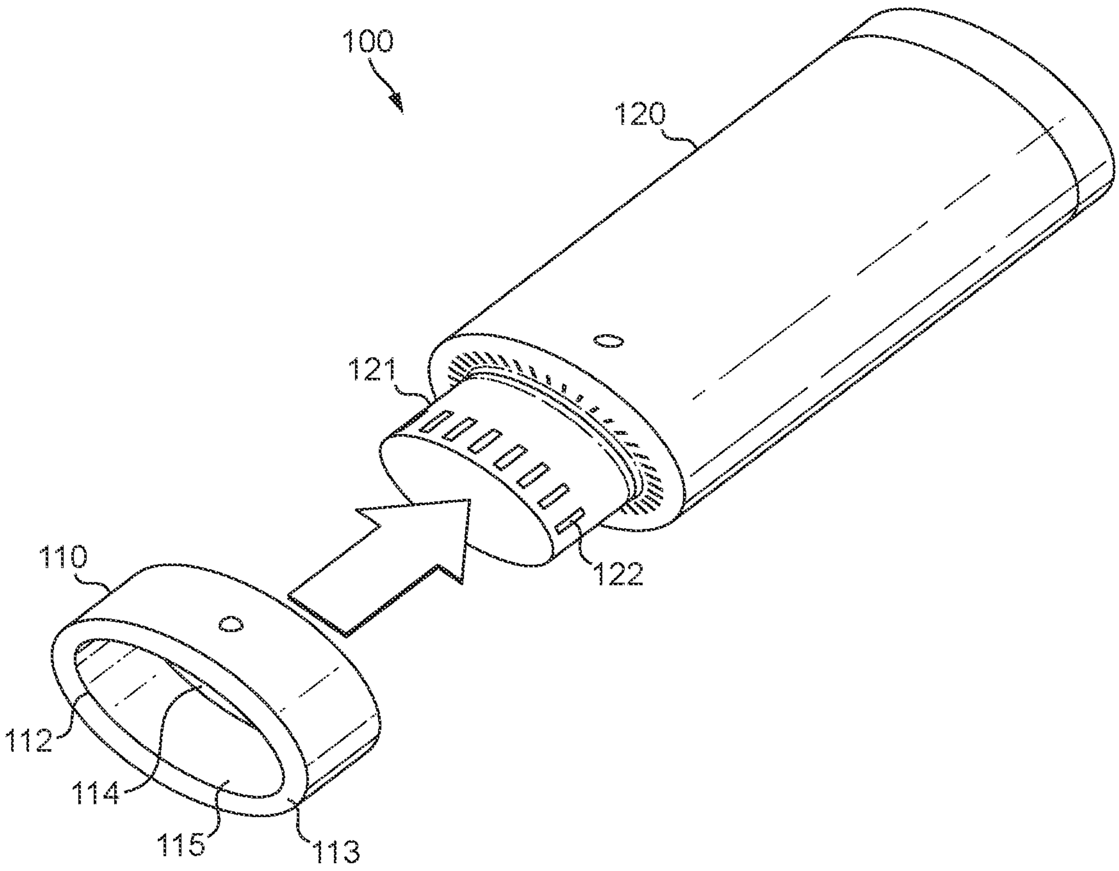
FIG. 1 shows a perspective view of an example of a combination of an apparatus and an article for heating smokable material.

As used herein, the term "smokable material" includes materials that provide volatilized components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be in a combination or a blend of materials.

Apparatus is known that heats smokable material to volatilize at least one component of the smokable material, typically to form an aerosol which can be inhaled, without burning or combusting the smokable material. Such apparatus is sometimes described as a "heat-not-burn" apparatus or a "tobacco heating product" or "tobacco heating device" or similar. The smokable material may be in the form of or provided as part of a cartridge or cassette or the like which can be inserted into the apparatus. A heater for heating and volatilizing the smokable material may be provided as a "permanent" part of the apparatus or may be provided as part of the smoking article or consumable which is discarded and replaced after use. A "smoking article" in this context is a device or article or other component that includes or contains in use the smokable material, which in use is heated to volatilize the smokable material, and optionally other components.

In broad terms, there is disclosed a combination of an article and an apparatus. The combination is arranged to heat smokable material to volatilize at least one component of said smokable material, typically to form a vapor or an aerosol which can be inhaled, without burning the smokable material. The article contains smokable material and the apparatus is adapted for volatilizing at least one component of the smokable material. The article is engageable with the apparatus and disengageable from the apparatus. The article is releasably engageable with the apparatus. The article may be releasably engaged with the end of the apparatus by, for example, any one, or a combination of, a snap fit, a friction fit and a screw fit. Such fits allow for fast and simple engagement and disengagement of the article from the apparatus by the user.

The smokable material is a layer on at least one surface of the article. The at least one surface may be an internal surface and/or an external surface. The at least one surface may be one or more internal surfaces and/or one or more external surfaces. The smokable material may be adhered to the at least one surface of the article. Alternatively or additionally, the smokable material may be held against the at least one surface of the article by a transparent wall. In some examples, the transparent wall is comprised in the article. In other examples, the transparent wall is comprised in the apparatus. In another example, the smokable material is removably adhered to the at least one surface of the article, so that it may be removed and disposed of after it has been volatilized in use, and then replaced by a fresh, non-volatilized layer of smokable material.

The apparatus comprises an irradiative light source for generating light. In some examples, the apparatus comprises plural irradiative light sources. (For the avoidance of doubt, a structure for transporting or distributing light, such as a light pipe for example, is not regarded as a light source in this context because the structure does not itself generate light.) The article and apparatus are arranged in relation to each other such that the irradiative light source or sources and the smokable material overlap radially of the apparatus when the article is engaged with the apparatus. The apparatus has a longitudinal axis that extends from a proximal end to a distal end, and "radially" is defined as being perpendicular to the longitudinal axis. In an example, the proximal end of the apparatus is a mouth end, and comprises a mouthpiece (not shown).

The irradiative light source or sources are configured to emit light radially of the apparatus so as to impinge upon the smokable material on the at least one surface of the article to volatilize at least one component of the smokable material. In some examples, the irradiative light source emits light radially outward of the apparatus, so as to impinge upon smokable material on an internal surface of the article. In some examples, the irradiative light source emits light radially inward of the apparatus, so as to impinge upon an external surface of the article. In these examples, the apparatus comprises an annular irradiative light source that substantially surrounds the external surface of the article.

The light source and the smokable material are movable relative to each other when the article is engaged with the apparatus to enable light emitted by the irradiative light source to be selectively directed in use to different portions of the smokable material on the at least one surface of the article.

Referring to FIG. 1, there is shown a perspective view of an example of a combination 100 of an article 110 and an apparatus 120. The combination 100 is arranged to heat smokable material 112 to volatilize at least one component of said smokable material 112, typically to form a vapor or an aerosol which can be inhaled, without burning the smokable material 112. The article 110 contains smokable material 112 and the apparatus 120 is adapted for volatilizing at least one component of the smokable material 112. The article 110 is engageable with the apparatus 120 and disengageable from the apparatus 120. The article 110 is releasably engageable with the apparatus 120. In this example, the article 110 is generally in the form of a lid or cap that can be fitted in use to an end 121 of the apparatus 120. The cap may be releasably engaged with the end 121 of the apparatus 120 by, for example, any one, or a combination of, a snap fit, a friction fit and a screw fit. Such fits allow for fast and simple engagement and disengagement of the article 110 from the apparatus 120 by the user. In other examples (not shown), the article 110 is slidably engaged with a different part of the apparatus 120, such as along a side of the apparatus 120.

The article 110 has a wall 113 defining a hollow interior 114. An inner surface 115 of the wall 113 has a layer of smokable material 112 thereon. In an example, the layer of smokable material 112 is a continuous layer on the inner surface 115 of the wall 113. As an alternative, the layer of smokable material 112 may be continuous but may contain a plurality of discrete portions of different composition (to give different flavors for example, and/or being different types of tobacco, and/or having different nicotine strength). In another example, the layer of smokable material 112 has a plurality of discrete regions of smokable material 112 on the inner surface 115 of the wall 114. The plurality of discrete regions of smokable material 112 may comprise two or more regions of smokable material 112 of different composition.

The smokable material 112 may be adhered to the inner surface 115 of the article 110. Alternatively or additionally, the smokable material 112 may be held against the inner surface 115 of the article 110 by a transparent wall (not shown). In some examples, the transparent wall is comprised in or part of the article 110. In other examples, the transparent wall is comprised in or part of the apparatus 120. In another example, the smokable material 112 is removably adhered to the inner surface 115 of the article 110, so that it may be removed and disposed of after it has been volatilized in use, and then replaced by a fresh, non-volatilized layer of smokable material 112.

The apparatus 120 comprises an irradiative light source 122. The arrangement is such that light emitted by the irradiative light source 122 in use is directed into the hollow interior 114 of the article 110 when the article 110 is engaged with the apparatus 120 so as to impinge upon the smokable material 112 on the inner surface 115 of the wall 113 of the article 110 to volatilize at least one component of the smokable material 112. The apparatus 120 is arranged to enable light emitted by the irradiative light source 122 to be selectively directed in use to different portions of the smokable material 112 on the inner surface 115 of the wall 113 of the article 110.

In an example, the combination 100 has at least one air inlet orifice (not shown) in a surface of the article 110 or the apparatus 120 or both to admit air into the combination 100 in use. The combination 100 has one or more inlet air flow passages (not shown) so that in use incoming air can flow from the air inlet orifices, through the inlet air flow passages and through or over the smokable material 112. The combination 100 has one or more outlet air flow passages (not shown) which are arranged so that air that has passed through or over the smokable material 112 can flow towards a mouthpiece (not shown) and exit the combination 100 through an opening of the mouthpiece. In use, air enters the air inlet orifice(s) and then through the inlet air flow passage(s) and then enters or flows over the smokable material 112 to entrain volatilized material produced when the smokable material 112 is heated by the irradiative light source 122. The air with entrained volatilized material then flows into the outlet air flow passage(s) after flowing through or over the smokable material 112. In some examples, the at least one air inlet orifice and the one or more inlet air flow passages are provided in or by the apparatus 120.

In some examples, a respective portion is heated multiple times to volatilize smokable material 112 repeatedly. However, for some smokable materials, reheating of previously volatilized smokable material 112 can result in an aerosol that tastes undesirable. Where an article comprises such a smokable material, a respective portion of smokable material 112 is heated only once. Some examples of the combination 100 provide at least one way of heating different portions of the smokable material 112.

In an example, the apparatus 120 of the combination 100 comprises a safety feature such that the article 110 cannot be disengaged from the apparatus 120 when the irradiative light source 122 is in use. This may be for example some lock or clip or the like which is activated, under control of for example a control circuitry, to lock the article 110 to the apparatus 120 when the irradiative light source 122 is in use. The safety feature reduces the risk of a user being able to make contact with the light source 122 when it is emitting light. The feature also reduces the risk of the irradiative light source 122 coming into contact with a flammable substance when it is emitting light. As another example, the safety feature is such that the light source 122 is turned off when the article 110 is at least partially disengaged from the apparatus 120 when the apparatus 120 is in use, again under control of for example a control circuitry. In another example, the safety feature is such that the light source 122 is turned off when a user attempts to disengage the article 110 from the apparatus 120, again under control of for example a control circuitry.

Figure 2:
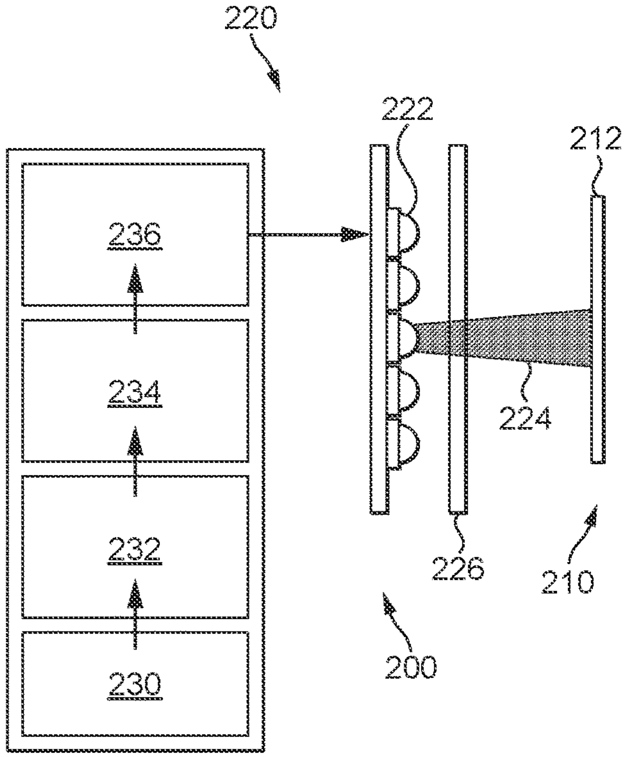
FIG. 2 shows a schematic view of another example of a combination of an apparatus and an article for heating smokable material.

Referring to FIG. 2, there is shown a schematic diagram of another example of a combination 200 for generating an inhalable medium. In the following description and in FIG. 2, components and features that are the same as or similar to the corresponding components and features of the example described with reference to FIG. 1 have the same reference numeral but increased by 100. For the sake of brevity, the description of those components and features will not be repeated in its entirety here. It will be understood that the arrangements and alternatives, etc. described above in relation to the example of FIG. 1 are also applicable to the example of FIG. 2. Again, in broad outline, the combination 200 of FIG. 2 comprises an article 210 (only a portion of which is shown in FIG. 2) and an apparatus 220 adapted to heat a smokable material 212 to form a vapor or an aerosol so as to produce an inhalable medium.

Contained within the apparatus 220 there is a power source 230 and electrical control circuitry 232, 234, 236 to power and control the functioning of the apparatus 220 respectively. The power source 230 may be a battery, which may be a rechargeable battery or a non-rechargeable battery. Examples of suitable batteries include for example a lithium-ion battery, a nickel battery (such as a nickel-cadmium battery), an alkaline battery and/or the like. Alternatively, the power source could be any suitable chemical or electrical source of energy, including for example a capacitor. The electrical control circuits may include for example one or more of a battery charge circuit 232, control circuitry 234 and light source control circuitry 236 to control the irradiative light source(s) 222.

Contained within the apparatus 220 there is a plurality of irradiative light sources 222 for irradiating smokable material 212 contained in use in the article 210. The irradiative light sources 222 produce light 224 which is used to heat the smokable material 212 of the article 210 when the article 210 is engaged with the apparatus 220. The term "light" here should normally be interpreted broadly, and includes for example any of infrared, visible and ultraviolet light. In general, suitable wavelengths of light may include wavelengths from around 150 nm to around 1 mm. Particularly suitable wavelengths of light include wavelengths from around 350 nm to around 450 nm and from around 900 nm to around 960 nm. For example, the irradiative light sources 222 may include a light emitting diode (LED) for generating visible light 224 at, for example, a wavelength of around 405 nm. In this example, five irradiative light sources 222 are shown. In other examples, there may be more or fewer irradiative light sources 222. As an alternative, the irradiative light sources 222 may be laser diodes, or may comprise at least one laser diode and at least one LED. In an example, a laser diode emits light at a wavelength of around 940 nm. The irradiative light sources 222 may emit light of the same wavelength or different wavelengths.

The combination 200 has a transparent wall or window 226 arranged between the irradiative light sources 222 and the smokable material 212. In an example, the transparent window 226 is located in the apparatus 220 and held in position by being fixed to a wall or housing (not shown) of the apparatus 220. In another example, the transparent window is located in the article 210 and held in position by being fixed to the wall (e.g. a wall 113 of an article 110 like that shown in FIG. 1) of the article 210. The transparent window 226 allows light 224 to pass but prevents or assists in preventing material produced in use by heating of smokable material 212 fouling the irradiative light sources 222. It should be noted that the transparent window 212 as a minimum needs only to be transparent to the wavelength(s) of light 224 that is emitted by the irradiative light sources 222, and indeed only sufficiently transparent to let sufficient light 224 through to heat the smokable material 212, and may be opaque or transparent to other wavelengths. The transparent window 226 may be rigid or substantially rigid. Suitable materials for the transparent window 226 include for example glass, of which a number of different types are suitable in this application, or plastics, of which again a number of different types are suitable in this application, such as a substantially rigid transparent film window. The transparent window 226 may for example have a thin film coating to ensure a suitable level of light transmission. Anti-bloom coatings for example may increase the transmission of light 224 through the window 226. In another example self-cleaning coatings may ensure a consistent transmission of light 224 through the window 226 over periods of use. In yet another example, the transparent window 226 may not be rigid, and may for example be in the form of a non-rigid film or the like. The transparent window 226 is arranged so as to prevent air and volatilized material flowing over the irradiative light sources 222, thus keeping the irradiative light sources 222 clean and free of contaminants, which is important to ensure a long lifetime for the apparatus 220 and the irradiative light source 222 and optical components. Further examples of use of such a window 226 are disclosed in our UK patent application no. 1508405.6 filed 15 May 2015, the entire content of which is hereby incorporated by reference.

The light sources 222 are located at a position in the apparatus 220 that is adjacent to the smokable material 212 when the article 210 is engaged with the apparatus 220, such that, in use, light 224 emitted by the light sources 222 is directed to impinge on the smokable material 212. In this example, the arrangement of the light sources 222 generally corresponds to an arrangement of different regions of smokable material 212. In the example of FIG. 2, the light sources 222 are arranged in a linear fashion to correspond to a linear arrangement of different regions of smokable material 212. In other examples, the light sources 222 may be arranged around the circumference of an end of the apparatus, as shown in FIG. 1, to correspond generally to the annular layer of smokable material 112 in the article 110.

In this example, the apparatus 220 is arranged to enable light 224 emitted by the irradiative light sources 222 to be selectively directed in use to different portions of the smokable material 212. In the example of FIG. 2, each of the plurality of light sources 222 is directed to a different portion of the smokable material 212. The apparatus 220 has light source control circuitry 236 constructed and arranged to selectively power the plural irradiative light sources 222. In an example, the irradiative light sources 222 are configured to emit light 224 sequentially, that is, with only one light source 222 emitting light at any particular time. In other examples, two or more of the irradiative light sources 222 may be configured to emit light 224 simultaneously; this may occur whenever those two or more of the irradiative light sources 222 are operated or may be under some control so that those two or more of the irradiative light sources 222 may selectively emit light simultaneously or only one at a time. In some examples, two or more irradiative light sources 222 may be arranged so that light 224 emitted by said two or more irradiative light sources 222 is directed to the same portion of the smokable material 212. In some instances, when the two or more irradiative light sources 222 emit light 224 simultaneously, the intensity of irradiation at said portion of the smokable material 212 is increased. In other instances, the two or more irradiative light sources 222 may be controlled to emit light 224 alternately in order to prevent overheating of the two or more irradiative light sources 222.

In an example, the light source control circuitry 236 is arranged such that light 224 is emitted from the plurality of irradiative light sources 222 in a predetermined sequence. In some examples, the plurality of irradiative light sources 222 are each directed to a different location on the smokable material 212. In some examples, the predetermined sequence may be determined by the user of the combination 200. For example, the user may select the predetermined sequence from a list of predetermined sequences stored in the control circuitry 234 or the light source control circuitry 236. As another example, the predetermined sequence may be automatically selected from a list of pre-determined programs, based on an identifying feature of the article that is engaged with the apparatus. For example, there may be a first sequence of operation that is applied when the apparatus 220 detects that the article 210 is of a type that contains plural different types of tobacco, and a second sequence of operation that is applied when the apparatus 220 detects that the article 210 is of a type that contains the same type of tobacco but with different flavorings in the different regions. As another example, the user may program their own sequence. As another example, the apparatus 220 may be programmable via an application on, for example, a so-called smart phone, or tablet computer or the like. As an alternative, the predetermined sequence may be a fixed program stored in the control circuitry 234 or the light source control circuitry 236 which cannot be altered by the user.

Figure 3:
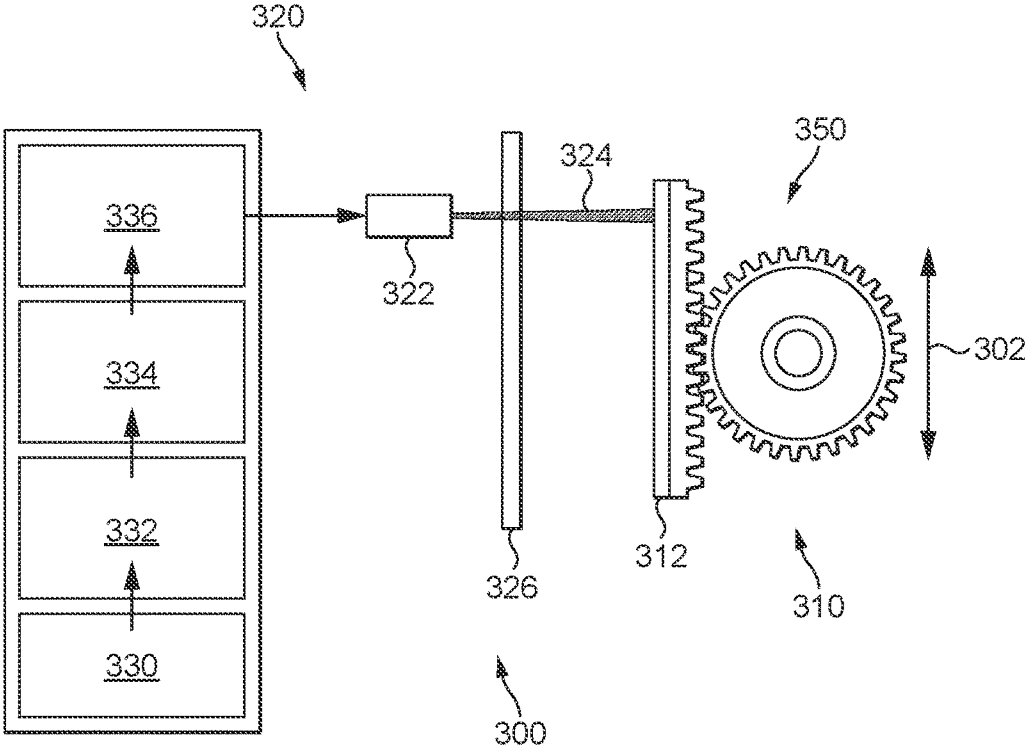
FIG. 3 shows a schematic view of another example of a combination of an apparatus and an article for heating smokable material.

Referring to FIG. 3, there is shown a schematic diagram of another example of a combination 300 for generating an inhalable medium. In the following description and in FIG. 3, components and features that are the same as or similar to the corresponding components and features of the example described with reference to FIG. 2 have the same reference numeral but increased by 100. For the sake of brevity, the description of those components and features will not be repeated in its entirety here. It will be understood that the arrangements and alternatives, etc. described above in relation to the example of FIGS. 1 and 2 are also applicable to the example of FIG. 3. Again, in broad outline, the combination 300 of FIG. 3 comprises an article 310 (only a portion of which is shown in FIG. 3) and an apparatus 320 adapted to heat a smokable material 312 to form a vapor or an aerosol so as to produce an inhalable medium.

Apparatus 320 comprises an irradiative light source 322 for irradiating smokable material 312 contained in use in an article 310. In general, suitable wavelengths of light may include wavelengths from around 150 nm to around 1 mm. Particularly suitable wavelengths of light include wavelengths from around 350 nm to around 450 nm and from around 900 nm to around 960 nm. For example, the irradiative light source 322 may include a light emitting diode (LED) for generating visible light 324 at, for example, a wavelength of around 405 nm. In this example, the irradiative light source 322 is a laser diode for generating light 324 at, for example, a wavelength of around 940 nm. In some examples, the apparatus 320 may contain a plurality of irradiative light sources 322, as described with reference to FIG. 2. The plurality of irradiative light sources 322 may be a combination of different types of light source, for example a laser diode and a LED. The irradiative light sources 322 may emit light of the same wavelength or different wavelengths.

Combination 300 comprises a moving arrangement 350 for moving the smokable material 312 relative to the light source 322, or sources, so as to selectively direct light 324 emitted by the irradiative light source 322 in use to different portions of the smokable material 312 at different times. In FIG. 3, the movement of the smokable material 312 is depicted by arrow 302. In FIG. 3, the moving arrangement 350 is shown schematically as a rack and pinion arrangement, but other arrangements are possible, including for example a piezoelectric driven arrangement. In this example, the movement of the smokable material 312 relative to the light source 322 is a linear movement. In other examples, the article 310 comprising the smokable material 312 is rotatably engaged with the apparatus 300, so that a rotation of the article 310 relative to the apparatus 320 results in the movement of the smokable material 312 relative to the irradiative light source(s) 322. The article 310 may be rotated automatically by control circuitry 334 controlling a mechanism in the apparatus 320. Alternatively, the article 310 may be rotated manually by a user, for example, after each puff. In an example, the smokable material is movable while the irradiative light source emits light. The light source may emit light substantially constantly while the smokable material is moving. Alternatively, the light source may pulse while the smokable material is moving.

Alternatively or additionally, the irradiative light source 322 may be movable within the apparatus 320, when the article 310 is engaged with the apparatus 320, so that the light 324 emitted by the irradiative light source 322 is directed to a different portion of the smokable material 312. In an example, the irradiative light source does not emit light while is it moving relative to the smokable material. In another example, the irradiative light source may emit light substantially constantly while moving. Alternatively, the light source may pulse while moving. For example, the irradiative light source 322 may rotate on an axis, so that light 324 is emitted from the irradiative light source 322 at a different angle for each rotated position of the irradiative light source 322 relative to the smokable material 312, such that a different portion of the smokable material 312 is volatilized. Alternatively or additionally, the irradiative light source 322 may move linearly, so that light 324 is emitted when the irradiative light source 322 is at different locations relative to the smokable material 312, such that a different portion of the smokable material 312 is volatilized.

The combination 300 further comprises a transparent wall or window 326 arranged between the irradiative light source 322 and the smokable material 312, as described herein with reference to FIG. 2. In an example, the transparent window 326 is rigidly joined to the irradiative light source 322, or a housing (not shown) around the irradiative light source 322, such that a movement of the irradiative light source 322 relative to the smokable material 312 results in a movement of the transparent window 326 relative to the smokable material 312. Such an arrangement ensures that the transparent window 326 is in a constant position relative to the irradiative light source 322, such that light 324 emitted by the irradiative light source 322 is always passed through the transparent window 326. In another example, the transparent window 326 is located in a fixed position in the article 310 and covers the smokable material 312. In another example, the transparent window 326 is movably located in the article 310, and the combination 300 is adapted and arranged so that the transparent window 326 is always positioned, in use, between the light source 322 and the portion of the smokable material 312 that is being irradiated.

Figure 4:
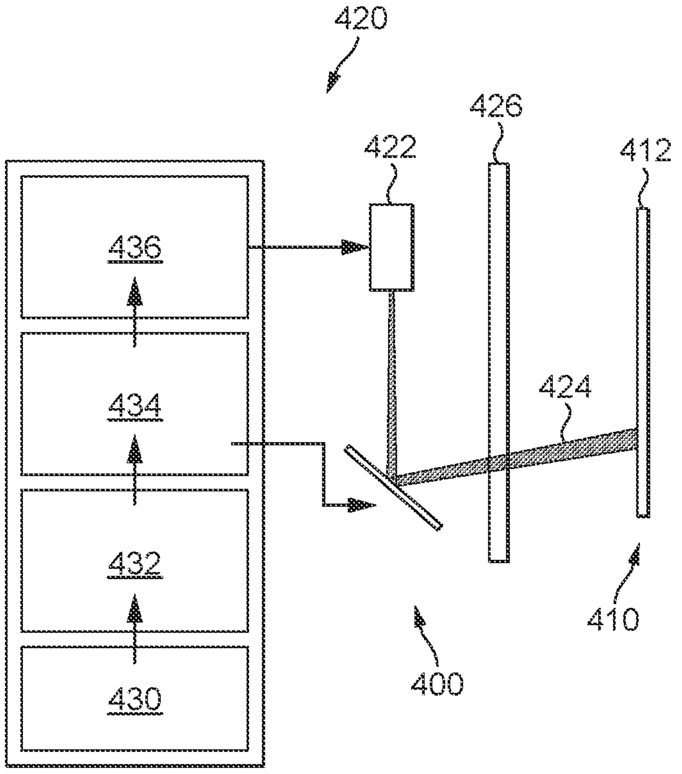
FIG. 4 shows a schematic view of another example of a combination of an apparatus and an article for heating smokable material.

Referring to FIG. 4, there is shown a schematic diagram of another example of a combination 400 for generating an inhalable medium. In the following description and in FIG. 4, components and features that are the same as or similar to the corresponding components and features of the example described with reference to FIG. 3 have the same reference numeral but increased by 100. For the sake of brevity, the description of those components and features will not be repeated in its entirety here. It will be understood that the arrangements and alternatives, etc. described above in relation to the example of FIGS. 1, 2 and 3 are also applicable to the example of FIG. 4. Again, in broad outline, the combination 400 of FIG. 4 comprises an article 410 (only a portion of which is shown in FIG. 4) and an apparatus 420 adapted to heat a smokable material 412 to form a vapor or an aerosol so as to produce an inhalable medium.

The apparatus 420 in use heats the smokable material 412 located in the article 410 using light 424 emitted by the irradiative light source 422. The light 424 emitted by the irradiative light source 422 is manipulated, i.e. focused and/or directed, by a beam deflector 428 so that the light 424 impinges upon the smokable material 412.

The apparatus 420 comprises at least one beam deflector 428 for manipulating light 424 emitted in use by the irradiative light source 422. The at least one beam deflector 428 for manipulating light 424 may be a mirror, a beam splitter, a collimator or any other optical component that enables the desired manipulation of the light 424. The manipulation of the light 424 by the beam deflector 428 may include one or more of focusing the light and directing/bending the light. In the example of FIG. 4, the beam deflector is a mirror 428 for reflecting the light 424 in a direction so that it impinges on the smokable material 412. In this example, the position (i.e. displacement) and/or angle of the mirror 428 is adjustable and controlled by control circuitry 434 in the apparatus 420, for example by driving a piezoelectric actuator (not shown) to move the mirror 428. In other examples, the control circuitry 434 may control any appropriate parameters of the at least one optical component 428 in use. In some examples, the beam deflector 428 is moved between puffs so that a different region of smokable material 412 is heated for each puff. Alternatively or additionally, the beam deflector 428 is movable during a puff, so that new smokable material 412 is heated during a puff.

A transparent window 426, as described herein with reference to FIG. 2 or 3, is arranged so as to prevent air and volatilized material flowing over the irradiative light source 422 and the at least one beam deflector 428, thus keeping the irradiative light source 422 and beam deflector(s) 428 clean and free of contaminants, which is important to ensure a long lifetime for the apparatus 420 and the irradiative light source 422 and beam deflector(s) 428.

Figure 5:
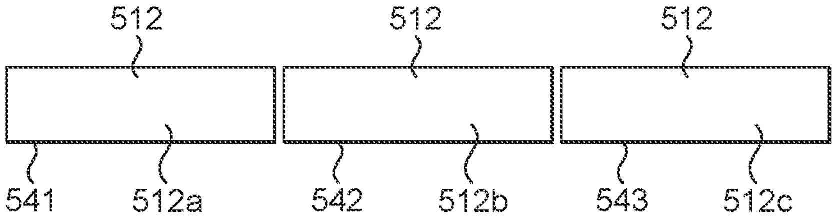
FIG. 5 shows a schematic view of a layer of smokable material for use with an apparatus for heating smokable material.

Referring to FIG. 5, there is shown an example of a layer 500 of smokable material 512 which is made up of a plurality of discrete regions 541, 542, 543 of smokable material 512. In the example of FIG. 5, the discrete regions 541, 542, 543 are provided by discrete portions of smokable material 512. As an alternative, there may be a continuous layer 500 of smokable material 512 which has discrete regions 541, 542, 543 within it (as will be discussed further below). In the example of FIG. 5, there are three discrete regions 541, 542, 543 of smokable material 512. Other examples may have more or fewer regions of smokable material. The layer 500 is suitable for use in any of the articles described herein with reference to any of FIGS. 1 to 4.

The layer 500 of smokable material 512 may be located in or on an article (not shown, but which may for example be an article as described above) for generating an inhalable medium using an irradiative light source. The smokable material 512 comprises a plurality of regions 541, 542, 543 of smokable material. In this example, each region in the plurality of regions 541, 542, 543 has a different composition of smokable material 512 from one another. In other examples, two or more of the regions 541, 542, 543 may have the same composition of smokable material 512. The article is arranged such that the plurality of regions 541, 542, 543 of smokable material 512 can be heated by light emitted by an irradiative light source of an apparatus with which the article can be engaged in use.

In some examples, the different compositions of smokable material 512 generate respective inhalable mediums that have different flavors. In some examples, the plurality of regions 541, 542, 543 are at or near an exterior surface of the article. In other examples, the plurality of regions 541, 542, 543 are at or near an interior surface of the article.

In some examples, the composition of each of the discrete regions in the plurality of regions 541, 542, 543 is a different type of tobacco or a different mix or blend of different tobaccos. Alternatively, each of the discrete regions 541, 542, 543 may be a different concentration of the same type of tobacco (that is, with different amounts of tobacco in the same unit area or volume).

One or more of the regions 541, 542, 543 of smokable material 512 may contain a flavoring or flavorant that is different from a flavoring or flavorant of one or more of the other regions 541, 542, 543 (it being understood that one or more of the other regions 541, 542, 543 may contain no added flavoring). As used herein, the terms "flavor" and "flavorant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus *Mentha*), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. The flavor may be a tobacco flavor. Where the flavor is delivered in liquid or gel form the tobacco flavor could be derived from tobacco extract. Where the flavor is derived from a solid product, the product could be tobacco leaf in shredded, particulate or granular form, or in the form of reconstituted tobacco sheet material.

Figure 6:
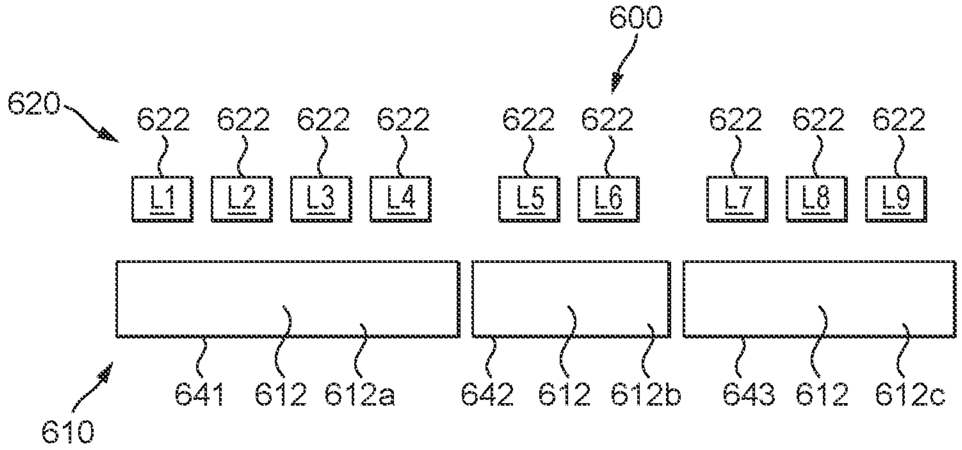
FIG. 6 shows a schematic view of portions of another example of a combination of an apparatus and an article for heating smokable material.

Referring to FIG. 6, there is shown an example of a combination 600 comprising a plurality of light sources 622 in an apparatus 620 (only a portion of which is shown in FIG. 6) and a layer of smokable material 612 in an article 610 (only a portion of which is shown in FIG. 6) of the general type as described herein with reference to FIG. 5, having a plurality of regions 641, 642, 643 of smokable material 612. The combination 600 of FIG. 6 may for example be employed as any of the combinations described herein with reference to FIGS. 1 to 4. For clarity, other features of the combination 600, such as the transparent wall, control circuitry of the apparatus 620, and the support wall of the article 610 are not shown.

In the example of FIG. 6, each of the plurality of light sources 622 is located at a position in the apparatus 620 such that in use light emitted by each respective light source 622 impinges on a different respective portion of the smokable material 612 when the article 610 is engaged with the apparatus 610. Again, it will be understood that in some examples, two or more of the light sources 622 may emit light that impinges on the same portion of the smokable material. In some examples, the light sources 622 and the smokable material 612 are movable relative to one another, such as described herein with reference to FIG. 3. In some examples, combination 600 may additionally or alternatively comprise one or more beam deflectors to deflect a beam of light emitted by one or more of the irradiative light sources 622, such as described herein with reference to FIG. 4.

In the example of FIG. 6, four irradiative light sources L1-L4 are arranged such that light emitted by the light sources L1-L4 impinges upon the first region 641 of smokable material. Two irradiative light sources L5-L6 are arranged such that light emitted by the light sources L5-L6 impinges upon the second region 642 of smokable material 612. Three irradiative light sources L7-L9 are arranged such that light emitted by the light sources L7-L9 impinges upon the third region 643 of smokable material 612. In other examples, there may be more or fewer irradiative light sources directed at each respective different region 641, 642, 643 of smokable material 612. In this example, each of the light sources L1-L9 is oriented in the same direction. In other examples, at least two of the light sources L1-L9 may be at different orientations from each other such that they are each directed to a different region of the smokable material 612.

In some examples, there is one respective irradiative light source 622 per discrete region 641, 642, 643 of smokable material 612. In some examples, the apparatus 620 has fewer irradiative light sources 622 than there are regions of smokable material 612. In some examples, the apparatus 620 has a single irradiative light source 622. In some examples, the irradiative light source(s) 622 are movable relative to the smokable material 612. The combination 600 is arranged so that in use different regions 641, 642, 643 of the smokable material 612 are impinged upon by light emitted by the irradiative light source(s) 622.

In some examples, the apparatus has control circuitry (not shown) configured so that light emitted by the irradiative light source(s) 622 in use is selectively directed to different regions 641, 642, 643 of the smokable material 612 at different times. In some examples, the control circuitry is configured so that light emitted by the irradiative light source or sources 622 in use is directed to a plurality of different regions 641, 642, 643 of the smokable material 612 simultaneously. In some examples, the control circuitry is configured so that light emitted by the irradiative light source or sources 622 in use is directed to the different regions 641, 642, 643 of the smokable material 612 according to a predetermined sequence such that a user experiences a flavor profile, that is, a sequence of different flavors over time. In some examples, the predetermined sequence may be determined by the user of the combination 600. For example, the user may select the predetermined sequence from a list of predetermined sequences stored in the control circuitry or the light source control circuitry of the apparatus 620. As another example, the predetermined sequence may be automatically selected from a list of pre-determined programs, based on an identifying feature of the article that is engaged with the apparatus. For example, there may be a first sequence of operation that is applied when the apparatus 620 detects that the article 610 is of a type that contains plural different types of tobacco, and a second sequence of operation that is applied when the apparatus 620 detects that the article 610 is of a type that contains the same type of tobacco but with different flavorings in the different regions. As another example, the user may set or program their own sequence. As another example, the apparatus 620 may be programmable via an application on, for example, a so-called smart phone, or tablet computer or the like, via a wired or wireless connection for example. As an alternative, the predetermined sequence may be a fixed program stored in the control circuitry or the light source control circuitry which cannot be altered by the user.

Referring to FIG. 7, there is shown an example of a sequence of activating the irradiative light sources L1-L9 of FIG. 6 for selectively heating different regions of the smokable material of FIG. 6 to create a flavor profile over the course of a smoking session of ten puffs. In the example shown in FIG. 7, region 642 is to be heated for two puffs, to generate vapor from the smokable material 612 of region 642. Region 641 is to be heated for five puffs, to generate vapor from the smokable material 612 of region 641. Region 643 is to be heated for three puffs, to generate vapor from the smokable material 612 of region 643.

In some examples, each puff is detected by a "puff sensor" in the apparatus, and the appropriate light sources are activated for that respective puff. The control circuitry of the apparatus may be configured to heat each respective region for only the sensed duration of that respective puff. Alternatively, the apparatus may be pre-configured to heat each respective region for an average duration of a puff, for example 2-3 seconds, after the initiation of the puff has been sensed. Alternatively or additionally, the user may provide an activation signal to indicate that they are about to start a smoking session. The apparatus may then enter an autonomous mode wherein each region of the smokable material is heated for a predetermined duration, based on the number of puffs for which that respective flavor is desired.

In some examples, only some of the irradiative light sources that are adjacent to a respective region of smokable material are activated simultaneously. Such a configuration may be employed to reduce the concentration of the flavor of that respective region. Alternatively, such a configuration may allow that respective region to be volatilized for a greater number of puffs.

Sequences, such as the example shown in FIG. 7, may be employed by combinations according to any of the previous examples wherein there are two or more regions of smokable material. In examples wherein the apparatus comprises fewer irradiative light sources than there are regions of smokable material, the sequence may dictate a specific position of the irradiative light source(s) relative to the smokable material, for each puff.

Figures 8, 9:
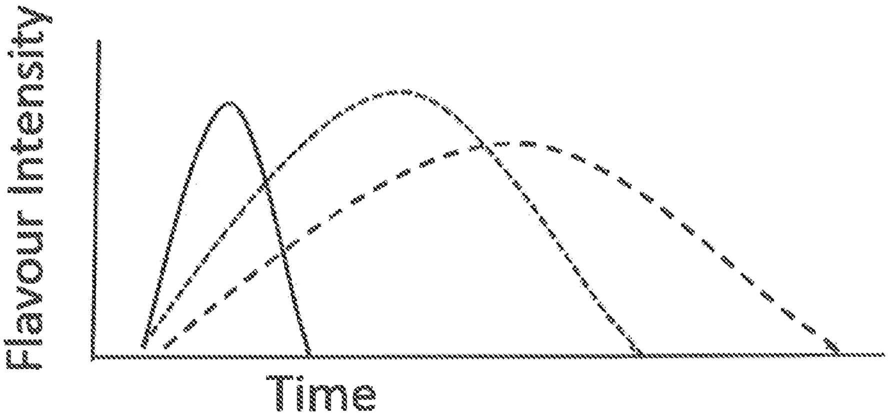
FIG. 8 shows schematically another example of a sequence of operation of light sources.
FIG. 9 shows schematically a representation of a flavor profile resulting from a sequence of operation of light sources.

Referring to FIG. 8, there is shown an example of a sequence of activating the irradiative light sources L1-L9 of FIG. 6 for selectively heating different regions of the smokable material of FIG. 6 to create a flavor profile over the course of a single puff. FIG. 9 depicts the flavor profile that the sequence of FIG. 8 would produce. The solid line represents the flavor from the region 641, the tightly-dashed line represents the flavor from the region 642 and the dashed line represents the flavor from the region 643.

In this example, the sequence is programmed to first deliver the flavor from the region 641, then deliver the flavor from the region 642 and finally deliver the flavor from the region 643, all in a puff with a duration of three seconds. For the first second, light sources L1-L3 and L5-L7 emit light. The user will therefore experience a combination of flavors, with the flavor from the region 641 being the dominant flavor. After one second, the light sources L1-L3 stop emitting light, resulting in the flavor from the region 642 becoming the dominant flavor. For the third second, light sources L5-L6 stop emitting light and light source L8 begins to emit light, so that the flavor from the region 643 is the dominant flavor.

Alternatively or additionally, a puff flavor profile is produced by moving the smokable material relative to the irradiative light source(s) during a puff. For example a light source is positioned relative to the smokable material to first emit light that impinges on a first region of smokable material and said light source is configured to then move relative to the smokable material so that light emitted by the light source impinges on a second region of smokable material, all during the same puff. A similar effect can be achieved by moving a beam deflector for manipulating a beam of light emitted by an irradiative light source during a puff, such that the beam of light impinges on two or more different regions of smokable material during said puff.

Additionally, in some examples, the smokable material is moved relative to the irradiative light source(s) between each puff or, equivalently, the position of a beam deflector in the apparatus is adjusted between each puff, so that the same portion of smokable material is not heated twice.

In some examples, the puff flavor profile is repeated for each puff in a smoking session. In other examples, different puff flavor profiles are produced in the same smoking session. As just one specific example to illustrate this, a user may prefer an intense tobacco flavor for the majority of their smoking session, with the final two puffs finishing with a menthol flavor.

Figure 10A:
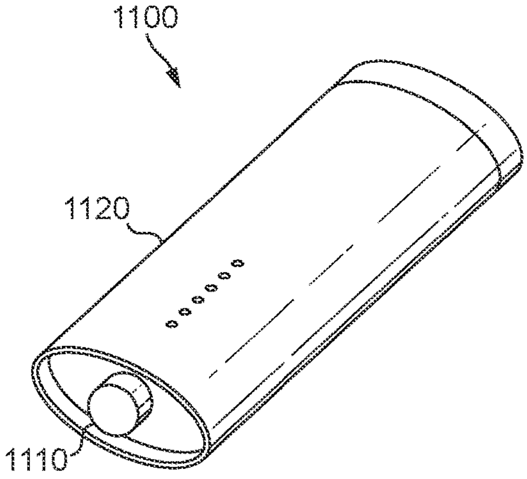
FIGS. 10A and 10B show perspective views of another example of a combination of an apparatus and an article for heating smokable material.
Figure 10B:
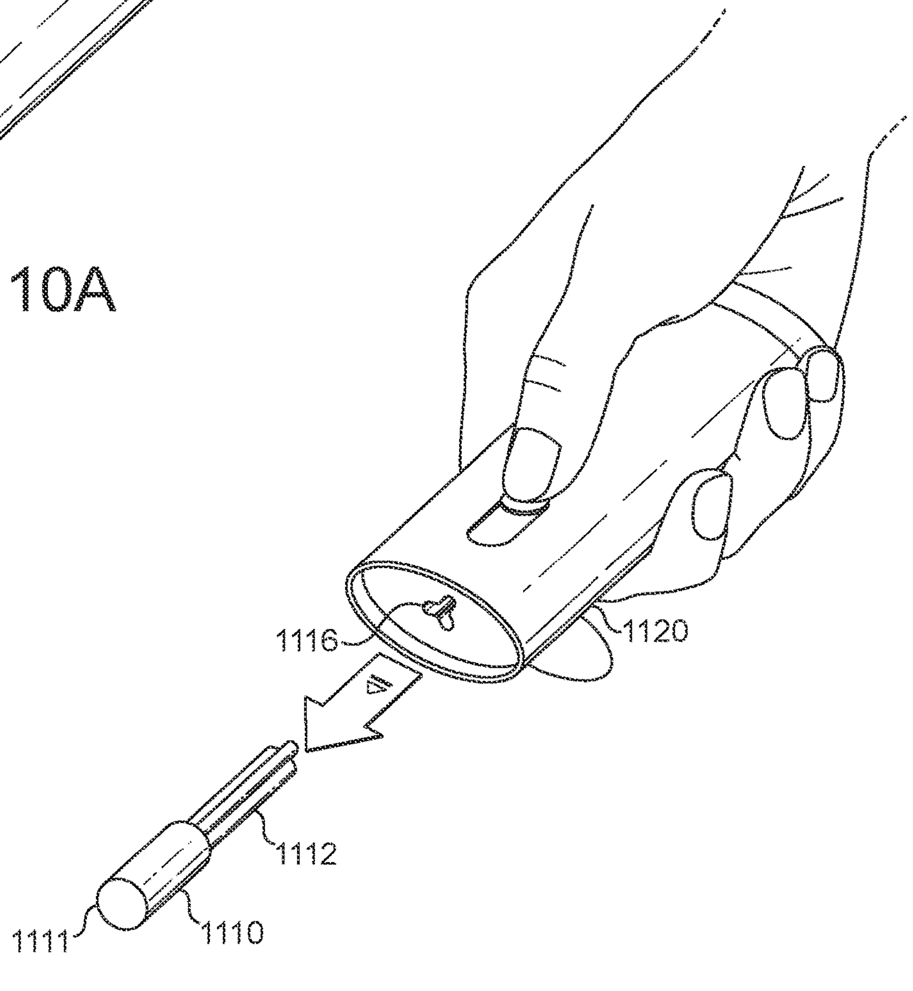
Figure 11:
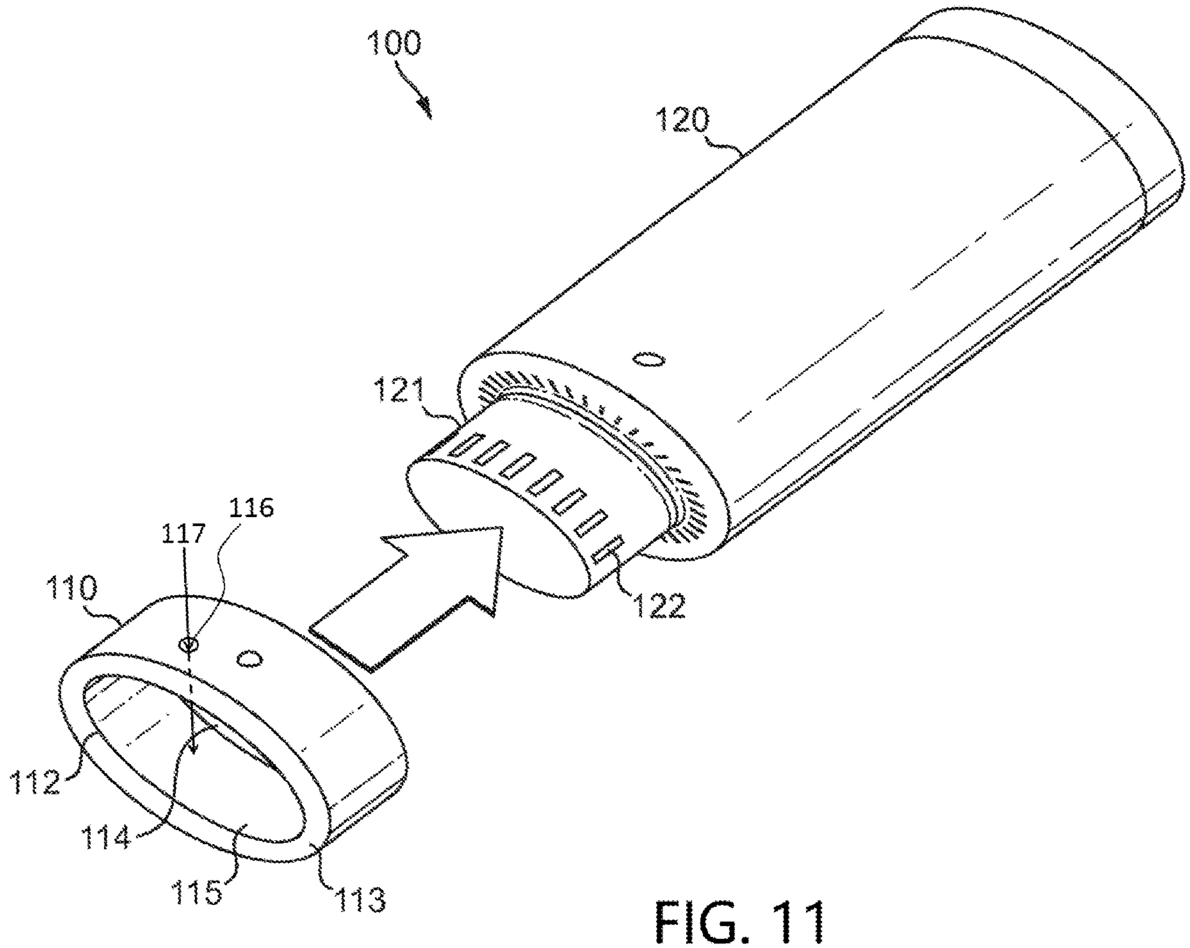
FIG. 11 shows a perspective view of an example of a combination of an apparatus and an article for heating smokable material.
Figure 12:
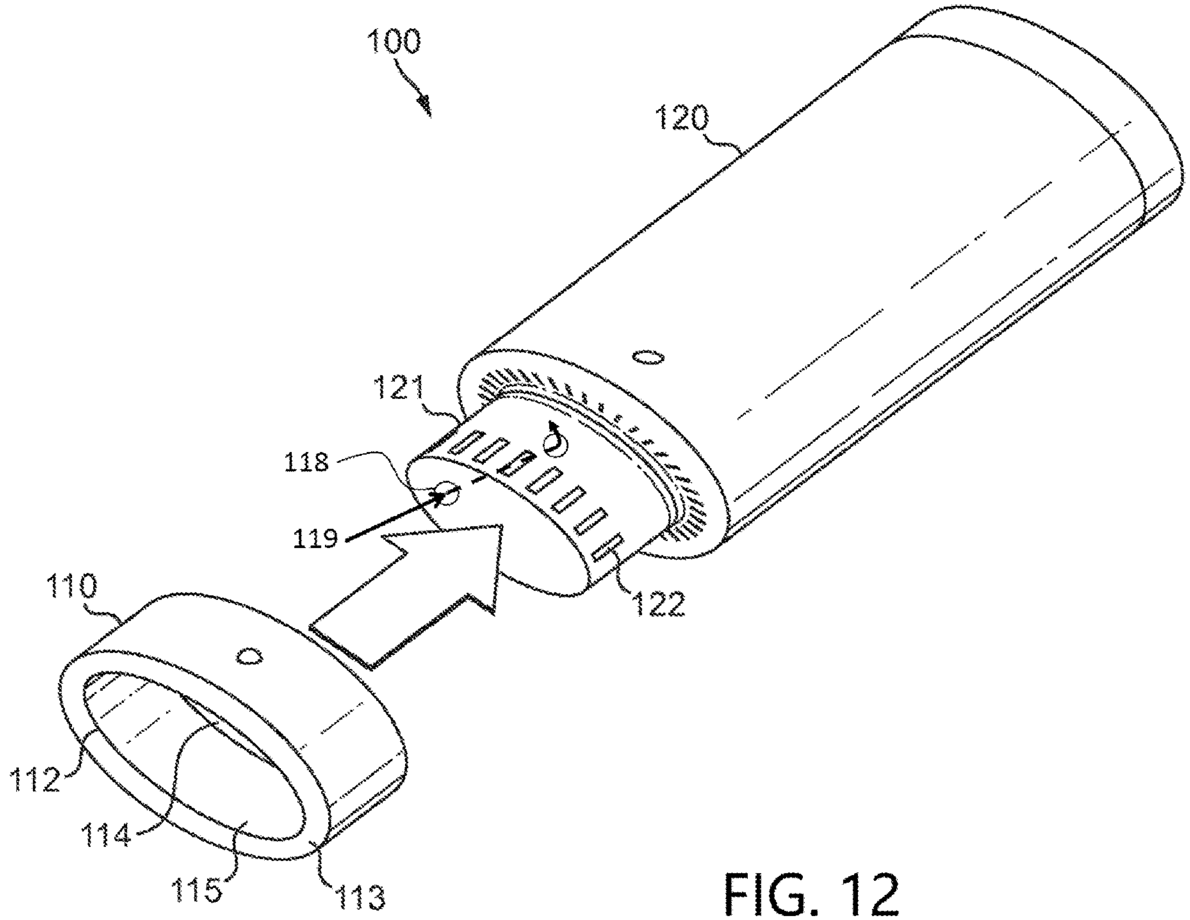
FIG. 12 shows a perspective view of an example of a combination of an apparatus and an article for heating smokable material.

Referring to FIGS. 10A and 10B, there is shown schematic diagrams of another example of a combination 1000 for generating an inhalable medium. In the following description and in FIGS. 10A and 10B, components and features that are the same as or similar to the corresponding components and features of the example described above with reference to FIG. 1 have the same reference numeral but increased by 1000. For the sake of brevity, the description of those components and features will not be repeated in its entirety here. It will be understood that the arrangements and alternatives, etc. described above are also applicable to the example of FIGS. 10A and 10B. Again, in broad outline, the combination 1000 of FIGS. 10A and 10B comprises an article 1110 and an apparatus 1120 adapted to heat a smokable material 1112 to form a vapor or an aerosol so as to produce an inhalable medium. The article 1110 is engageable with the apparatus 1120 and disengageable from the apparatus 1120. The article 1110 is releasably engageable with the apparatus 1120. In FIG. 10A, the article 1110 is shown fully received within the apparatus 1120 and in FIG. 10B the article 1110 is shown outside the apparatus 1120.

In this example, the article 1110 has a cap or head 1111. Smokable material 1112 is provided as a rod or stick, or as a coating or the like on the exterior of a rod or stick, which projects from the cap 1111. The apparatus 1120 has an aperture 1116 through which the smokable material 1112 is passed so that the smokable material 1112 enters the interior of the apparatus 1120. The apparatus 1120 comprises one or more irradiative light sources (not shown). The or each irradiative light source is arranged within the apparatus 1120 so that the light emitted by the or each irradiative light source is directed inwardly of the apparatus 1120. In this way, light emitted by the or each irradiative light source impinges on the smokable material 1112 when the article 1110 is engaged with the apparatus 1120 to volatilize at least one component of the smokable material 1112. As in the example described above, the apparatus 1120 may be arranged to enable light emitted by the or each irradiative light source 1122 to be selectively directed in use to different portions of the smokable material 1112 of the article 1110.

There may also be provided an article for generating an inhalable medium using an irradiative light source, the article comprising: smokable material comprising at least two regions having a different composition from each other; the article being arranged such that the at least two regions of smokable material can be heated by light emitted by an irradiative light source of an apparatus with which the article can be engaged in use.

There may also be provided in combination, an article as described above and an apparatus for volatilizing at least one component of the smokable material, wherein: the article is engageable with the apparatus and disengageable from the apparatus; and wherein: the apparatus comprises an irradiative light source located in the apparatus; wherein the arrangement is such that light emitted by the irradiative light source in use is directed so as to impinge upon the smokable material of the article to volatilize at least one component of the smokable material when the article is engaged with the apparatus; the apparatus being arranged to enable light emitted by the irradiative light source to be selectively directed in use to different regions of the smokable material.

There may also be provided a method of heating a smokable material to volatilize at least one component of the smokable material, the method comprising: heating a first region of smokable material with light emitted by an irradiative light source, and heating a second region of smokable material with light emitted by an irradiative light source; wherein the composition of the smokable material of the first region is different from the composition of the smokable material of the second region.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A system comprising:

an article containing smokable material; and an apparatus for volatilizing at least one component of the smokable material, wherein:

the article is engageable with the apparatus and disengageable from the apparatus, the article comprises a wall defining a hollow interior, an inner surface of the wall having a layer of smokable material thereon, the apparatus comprises an irradiative light source located in the apparatus, light emitted by the irradiative light source in use is directed into the interior of the article when the article is engaged with the apparatus so as to impinge upon the smokable material on the inner surface of the wall of the article to volatilize at least a first region and a second region of the smokable material, the apparatus being arranged to enable light emitted by the irradiative light source to be selectively directed in use to different portions of the smokable material on the inner surface of the wall of the article, wherein the apparatus is configured to enable movement of the irradiative light source relative to at least one of the first region of smokable material or the second region of smokable material, and the apparatus further comprises a beam deflector to reflect light emitted by the irradiative light source to a first region of the smokable material, the beam deflector being movable such that the light emitted by the irradiative light source is directed to a second region of the smokable material after the beam deflector has been moved.

2. A method of heating a smokable material to volatilize at least one component of the smokable material, the method comprising:

engaging an article containing smokable material with an apparatus for volatilizing at least one component of the smokable material, the apparatus comprising at least one irradiative light source for generating light, the smokable material being a layer on at least one surface of the article, the at least one irradiative light source and the smokable material overlapping radially of the apparatus when the article is engaged with the apparatus;

providing a beam deflector to reflect light emitted by the at least one irradiative light source to a first region of smokable material;

heating the first region of smokable material with the light emitted by the at least one irradiative light source;

moving the beam deflector such that the light emitted by the at least one irradiative light source is reflected to a second region of the smokable material after the beam deflector has been moved;

heating the second region of smokable material with light emitted by the at least one irradiative light source; and moving the smokable material and the at least one irradiative light source relative to each other via moving the at least one irradiative light source relative to at least one of the first region of smokable material or the second region of smokable material, wherein light emitted by the at least one irradiative light source is emitted radially of the apparatus to impinge on the smokable material.

3. The method according to claim 2, wherein the at least one irradiative light source that heats the first region of smokable material is a different irradiative light source from the at least one irradiative light source that heats the second region of smokable material.

4. The method according to claim 2, further comprising:

heating a plurality of regions of the smokable material including the first region and the second region in a predetermined sequence.

5. The method according to claim 2, further comprising:

moving the smokable material relative to the at least one irradiative light source.

* * * * *